(12) United States Patent
Yamaguchi et al.

(10) Patent No.: US 10,801,449 B2
(45) Date of Patent: Oct. 13, 2020

(54) AIRFLOW CONTROL VALVE STRUCTURE AND INTAKE DEVICE

(71) Applicant: AISIN SEIKI KABUSHIKI KAISHA, Kariya-shi, Aichi-ken (JP)

(72) Inventors: Tomohiro Yamaguchi, Toyota (JP); Hiromitsu Ishihara, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 127 days.

(21) Appl. No.: 16/309,496

(22) PCT Filed: Mar. 22, 2017

(86) PCT No.: PCT/JP2017/011552
§ 371 (c)(1),
(2) Date: Dec. 13, 2018

(87) PCT Pub. No.: WO2017/221487
PCT Pub. Date: Dec. 28, 2017

(65) Prior Publication Data
US 2019/0128224 A1 May 2, 2019

(30) Foreign Application Priority Data
Jun. 20, 2016 (JP) .................................. 2016-121837

(51) Int. Cl.
*F02M 35/10* (2006.01)
*F16K 1/22* (2006.01)
(Continued)

(52) U.S. Cl.
CPC ....... *F02M 35/10255* (2013.01); *F02B 31/06* (2013.01); *F02B 75/20* (2013.01);
(Continued)

(58) Field of Classification Search
CPC ...... F16K 1/165; F16K 1/2021; F16K 1/2028; F16K 1/223; F16K 1/224; F16K 31/521;
(Continued)

(56) References Cited

U.S. PATENT DOCUMENTS

| 4,674,528 A * | 6/1987 | Nishio ................. F16K 1/2261 137/375 |
| 2007/0051339 A1* | 3/2007 | Torii ...................... F02D 9/1095 123/336 |

(Continued)

FOREIGN PATENT DOCUMENTS

CN         204492989 U         7/2015

OTHER PUBLICATIONS

An English Translation of the International Preliminary Report on Patentability (Form PCT/IB/373) and the Written Opinion of the International Searching Authority (Form PCT/ISA/237) dated Dec. 25, 2018, by the International Bureau of WIPO in corresponding International Application No. PCT/JP2017/011552. (4 pages).

(Continued)

*Primary Examiner* — Hailey K. Do
(74) *Attorney, Agent, or Firm* — Buchanan Ingersoll & Rooney PC

(57) ABSTRACT

An airflow control valve structure includes a metallic pivot shaft and a valve body. The valve body includes a connection portion connected to the pivot shaft and a resin valve portion. The pivot shaft includes first and second pivot shaft side press-fit portions. The connection portion includes a first valve side press-fit portion formed integrally with the valve portion and a metallic fitting member including a second valve side press-fit portion. The first valve side press-fit portion is fitted to the first pivot shaft side press-fit portion at an angular position at which a phase of the valve portion is matched with a phase of the pivot shaft. The (Continued)

second valve side press-fit portion is fitted to the second pivot shaft side press-fit portion. The first pivot shaft side press-fit portion is longer than the second valve side press-fit portion.

9 Claims, 5 Drawing Sheets

(51) Int. Cl.
| | |
|---|---|
| F02B 31/06 | (2006.01) |
| F16K 1/20 | (2006.01) |
| F16K 11/052 | (2006.01) |
| F02B 75/20 | (2006.01) |
| F02M 35/112 | (2006.01) |
| F02B 75/18 | (2006.01) |

(52) U.S. Cl.
CPC ......... *F02M 35/112* (2013.01); *F16K 1/2021* (2013.01); *F16K 1/2028* (2013.01); *F16K 1/223* (2013.01); *F16K 1/224* (2013.01); *F16K 11/052* (2013.01); *F02B 2075/1816* (2013.01); *Y02T 10/146* (2013.01)

(58) Field of Classification Search
CPC ............... F16K 11/052; F16K 11/0525; F16K 27/0218; F02M 35/10255; F02B 31/06; F02B 31/08; F02B 31/085; F02B 31/087; Y10T 137/0525; Y10T 137/6055; Y10T 137/85743; Y10T 137/86823

See application file for complete search history.

(56) References Cited

U.S. PATENT DOCUMENTS

2014/0299803 A1* 10/2014 Hansen ................ B23P 15/001
  251/92
2019/0331230 A1* 10/2019 Yamamoto ............. F16K 1/224

OTHER PUBLICATIONS

International Search Report (PCT/ISA/210) dated Jun. 20, 2017, by the Japanese Patent Office as the International Searching Authority for International Application No. PCT/JP2017/011552.
Written Opinion (PCT/ISA/237) dated Jun. 20, 2017, by the Japanese Patent Office as the International Searching Authority for International Application No. PCT/JP2017/011552.

* cited by examiner

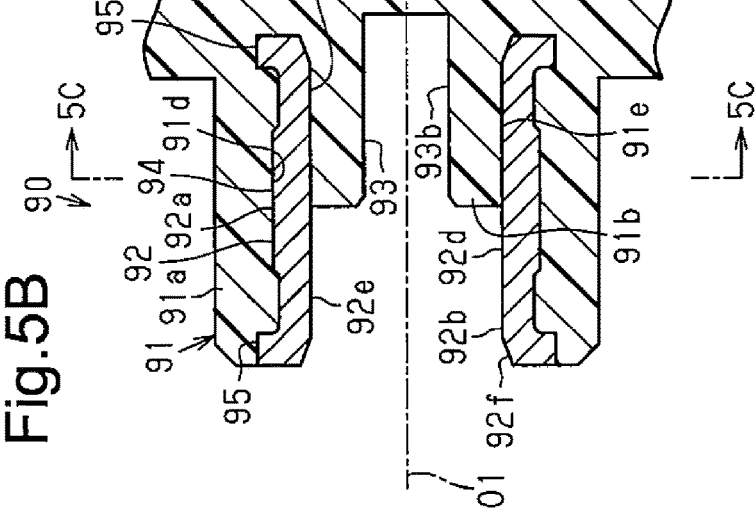
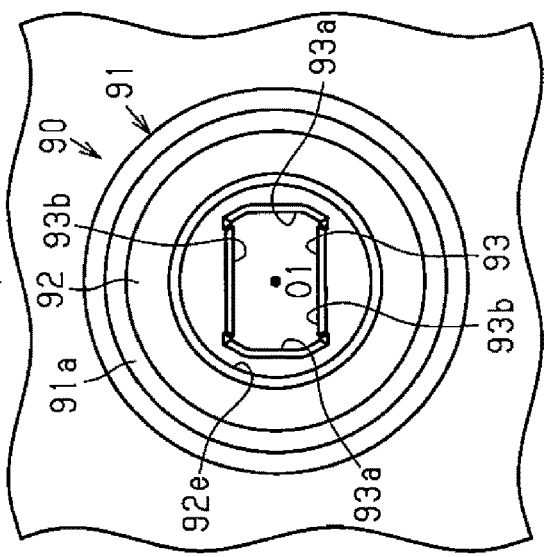
Fig.5A  Fig.5B  Fig.5C ding # AIRFLOW CONTROL VALVE STRUCTURE AND INTAKE DEVICE

TECHNICAL FIELD

The present invention relates to an airflow control valve structure and an intake device, and particularly to an airflow control valve structure and an intake device including a valve body that controls the flow of gas supplied to a combustion chamber of an internal combustion engine.

BACKGROUND ART

Patent document 1 describes an example of a conventional airflow control valve structure. In the airflow control valve structure, a projection having the form of a triangular post and a connection block having the form of a cylinder formed integrally with a valve body are respectively inserted into a recess groove and a through-hole formed in a power transmission member (crankshaft). Then, the connection block and the through-hole are welded through ultrasonic welding to integrally couple the valve body to the crankshaft.

PRIOR ART DOCUMENT

Patent Document

Patent Document 1: Chinese Utility Model Publication No. 204492989

SUMMARY OF THE INVENTION

Problems that are to be Solved by the Invention

In such an airflow control valve structure, the projection and the connection block of the valve body are respectively inserted into the recess groove and the through-hole of the power transmission member in a state provided with play. Thus, when the valve body is inserted into the power transmission member, a phase shift may occur between the valve body and the power transmission member. Further, even after the insertion, a similar phase shift may occur during ultrasonic welding.

It is an object of the present invention to provide an airflow control valve structure and an intake device that can be integrally coupled while reducing a phase shift between a valve body and a power transmission member.

Means for Solving the Problem

In order to achieve the above object, the airflow control valve structure according to one embodiment of the disclosure includes a metallic pivot shaft pivoted about a pivot axis and a valve body. The valve body includes a connection portion that is connected to the pivot shaft to pivot integrally with the pivot shaft and a resin valve portion that opens and closes a part of a cross-sectional area of an intake passage. The pivot shaft includes a first pivot shaft side press-fit portion and a second pivot shaft side press-fit portion that are formed along the pivot axis. The connection portion includes a first valve side press-fit portion formed integrally with the valve portion and a metallic fitting member including a second valve side press-fit portion. The first valve side press-fit portion is fitted to the first pivot shaft side press-fit portion at an angular position at which a phase of the valve portion is matched with a phase of the pivot shaft. The second valve side press-fit portion is fitted to the second pivot shaft side press-fit portion. The first pivot shaft side press-fit portion is set to be longer than the second valve side press-fit portion in dimension in a pivot axis direction.

BRIEF DESCRIPTION OF THE DRAWINGS

FIG. 5A is a side view showing the structure of the connection portion of the airflow control valve structure according to the embodiment, FIG. 5B is a cross-sectional view taken along line 5B-5B in FIG. 5A, and FIG. 5C is a cross-sectional view taken along line 5C-5C in FIG. 5B.

EMBODIMENTS OF THE INVENTION

Figure 1:
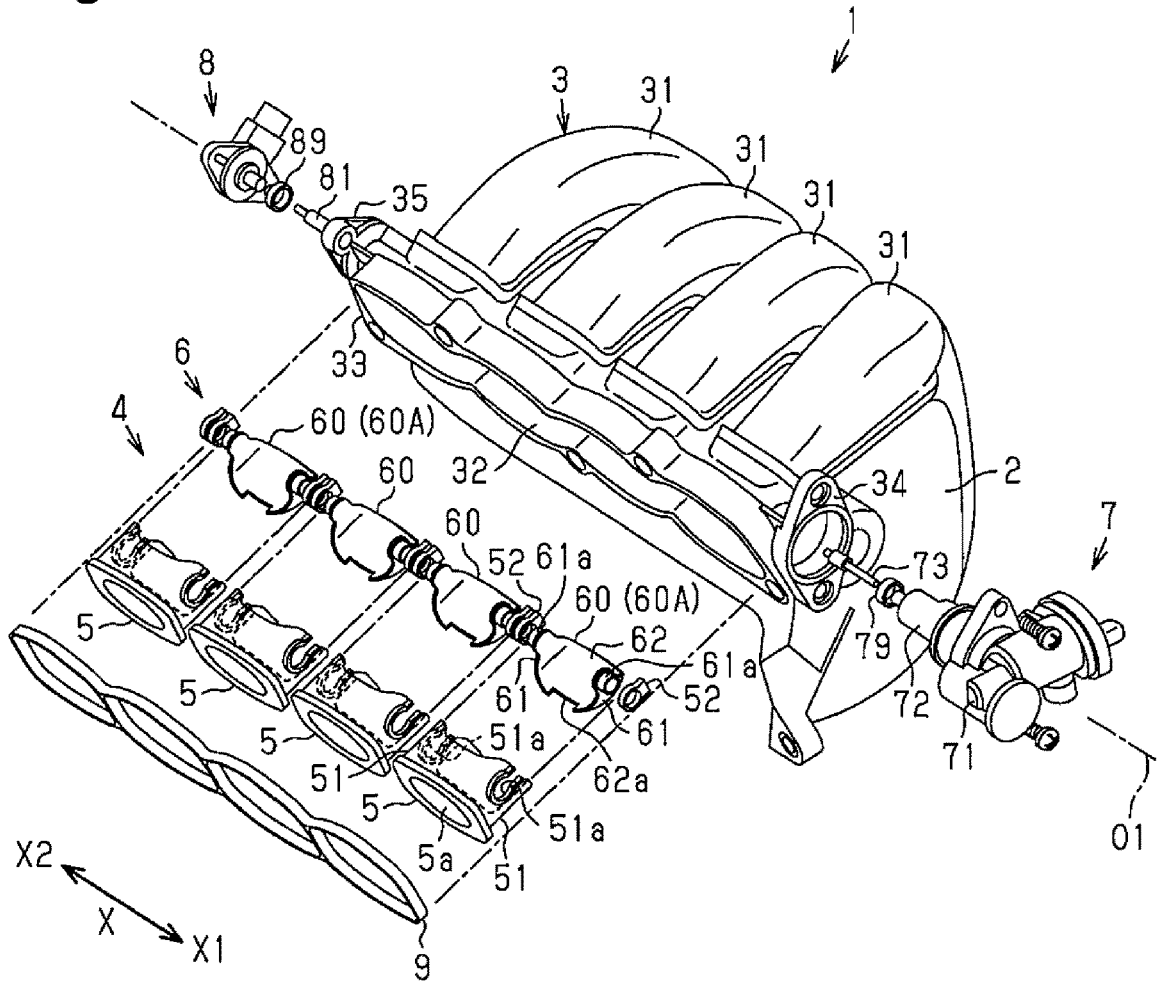
FIG. 1 is an exploded perspective view showing the structure of an intake device and an airflow control valve structure according to one embodiment.

One embodiment of an airflow control valve structure and an intake device will now be described. As shown in FIG. 1, an intake device 1 installed in an inline four-cylinder engine for a vehicle draws in air, mixes the air with fuel supplied from an injector, and supplies the mixed air (hereafter referred to as "air-fuel mixture") to a combustion chamber when an intake valve opens in an intake stroke of the engine. The engine compresses and ignites the air-fuel mixture in the combustion chamber to burn the air-fuel mixture. The engine transmits expansion force resulting from the combustion from a piston to a crankshaft. This obtains the driving force of the engine from the crankshaft.

The intake device 1 includes a surge tank 2 and a resin intake manifold 3 that forms a plurality of (four) intake passages 31 branching from an outlet side of the surge tank 2. The direction in which the intake passages 31 are arranged next to one another is referred to as the X direction. One side and the other side (right side and left side in FIG. 1) in the X direction are respectively referred to as the X1 side and the X2 side.

Outlets of the intake passages 31 are entirely connected to form a substantially tubular inner wall surface 32 and also form an open end 33 that extends around the entire edge of an opening of the inner wall surface 32. The open end 33 is for connection to a cylinder head (not shown). The open end 33 includes a groove (not shown) into which a gasket is fitted.

The intake device 1 also includes an intake control valve 4 serving as an airflow control valve structure in the vicinity of the outlet of the intake manifold 3.

The intake control valve 4 includes a plurality of (four) substantially tubular holding members 5 fitted into the inner wall surface 32 in correspondence with the intake passages 31. Each holding member 5 includes an opening 5a having a predetermined opening area (cross-sectional area of flow passage). Two walls 51 of the holding member 5 facing each other in the X direction each include a substantially U-shaped support groove 51a open toward the intake passage 31 and communicated in the X direction.

The intake control valve 4 also includes an intake control valve body 6. The intake control valve body 6 includes a plurality of (four) valve bodies 60 arranged next to one another in the X direction.

The valve bodies 60 each include an integrated flat valve portion 62 connecting two side walls 61 facing the walls 51 of the holding member 5 and distal ends of the two side walls 61 in the X direction. A part of the valve portion 62 is cut away to form a control passage portion 62a.

The side walls 61 of the valve body 60 each include a substantially protruding shaft portion 61a projecting away from each other in the X direction. The shaft portion 61a is inserted into a substantially keyhole-shaped bearing member 52, which opens in the X direction. The bearing member 52 is fitted into the support groove 51a of the holding member 5 to pivotally support the shaft portion 61a in cooperation with the holding member 5. That is, each valve body 60 is pivotal about an axis extending in the X direction through the holding member 5 and the bearing member 52.

Figure 2:
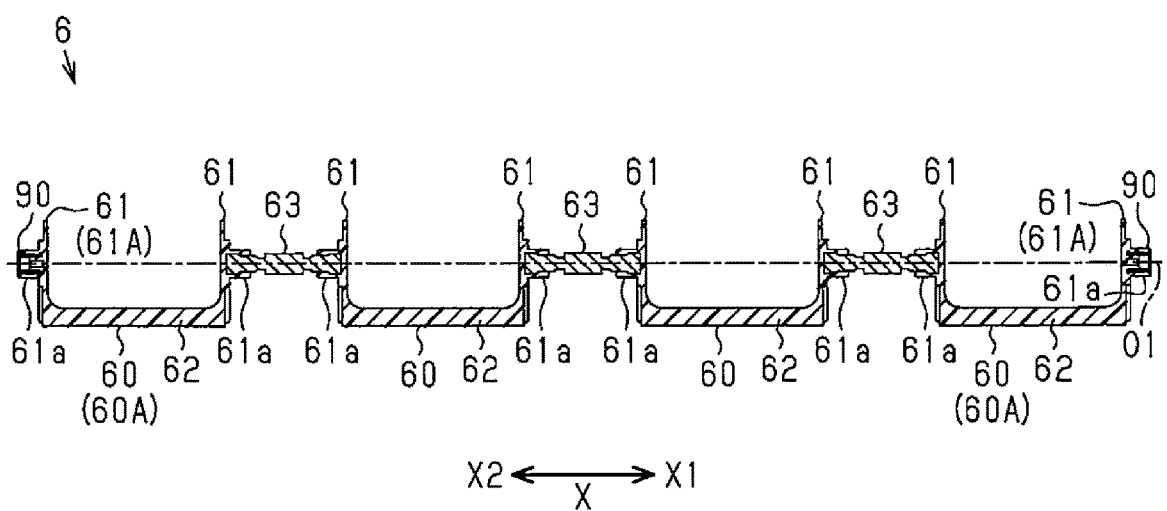
FIG. 2 is a cross-sectional view showing the structure of the airflow control valve structure according to the embodiment.

As shown in FIG. 2, the intake control valve body 6 includes a plurality of (three) connection shafts 63 that connect adjacent valve bodies 60 in the X direction. That is, the connection shaft 63 is fixed to the shaft portions 61a of the valve bodies 60 adjacent to the two of the connection shaft 63. Thus, the valve bodies 60 are all pivoted integrally about the axis (hereafter referred to as "pivot axis O1") extending in the X direction.

When the valve portion 62 is in a pivot position in which the valve portion 62 falls along the inner wall surface to open the opening 5a, the valve body 60 is in an open state that maximizes the open area of the opening 5a. When the valve portion 62 is in a pivot position in which the valve portion 62 rises from the inner wall surface to close a part of the opening 5a, the valve body 60 is in a reduced state that minimizes the open area of the opening 5a.

As shown in FIG. 1, a first attachment portion 34 is formed near the outlet of the intake manifold 3 at the X1 side. An electric actuator 7 is attached to the first attachment portion 34.

The electric actuator 7 includes a motor 71, a drive gear 72 serving as a power transmission member, and a metallic pivot shaft 73. The drive gear 72 is driven by and connected to the motor 71 and pivoted about the pivot axis O1. The pivot shaft 73 is substantially cylindrical and includes a step, concentric with the pivot axis O1, and includes an end at the X1 side connected to the drive gear 72 to be pivoted integrally with the drive gear 72. An end of the pivot shaft 73 at the X2 side is inserted through the first attachment portion 34 and connected to the adjacent valve body 60, that is, the intake control valve body 6 so as to pivot integrally with the valve body 60. In other words, the pivot shaft 73 and the intake control valve body 6 are integrally pivoting when the drive gear 72 pivots about the pivot axis O1.

A mechanical lock unit (not shown) is arranged between the drive gear 72 and the intake manifold 3. The mechanical lock unit restricts the rotation of the drive gear 72 when the phases of the drive gear 72 and the intake manifold 3 reach predetermined initial phases (i.e., phases that correspond to the open state of the valve body 60). The pivot shaft 73 is inserted through an annular sealing member 79 arranged between the pivot shaft 73 and the first attachment portion 34. The sealing member 79 prevents the leakage of gas out of the intake passage 31 from between the first attachment portion 34 and the pivot shaft 73.

A second attachment portion 35 is formed near the outlet of the intake manifold 3 at the X2 side. A sensor unit 8 is attached to the second attachment portion 35.

The sensor unit 8 includes a metallic pivot shaft 81. The pivot shaft 81 is substantially cylindrical and includes a step, concentric with the pivot axis O1, in the same manner as the pivot shaft 73. An end of the pivot shaft 81 at the X1 side is inserted through the second attachment portion 35 and connected to the adjacent valve body 60, that is, the intake control valve body 6, so as to pivot integrally with the valve body 60. In other words, the pivot shaft 81 and the intake control valve body 6 are integrally pivoting when the intake control valve body 6 pivots about the pivot axis O1. The sensor unit 8 is configured to detect the pivot position of the pivot shaft 81, that is, opening degree information of the intake control valve body 6. In the same manner as the pivot shaft 73, the pivot shaft 81 is inserted through an annular sealing member 89 arranged between the pivot shaft 81 and the second attachment portion 35. Thus, in the intake device 1, the two pivot shafts 73 and 81 and the intake control valve body 6 are pivoted integrally about the pivot axis O1. The electric actuator 7 is drive-controlled by an electronic control unit (not shown). The electronic control unit drive-controls the electric actuator 7 to control the position of the intake control valve body 6 based on information obtained from an operation map in accordance with engine speed and a load condition. In this case, the electronic control unit performs feedback control when driving the electric actuator 7 based on the opening degree information of the intake control valve body 6 detected by the sensor unit 8. The connection structure of the pivot shafts 73 and 81 and the adjacent valve body 60 (hereafter also referred to as "valve body 60A") will now be described. The side walls 61 and the valve portion 62 of the valve body 60A are formed integrally from a resin material.

Figure 3:
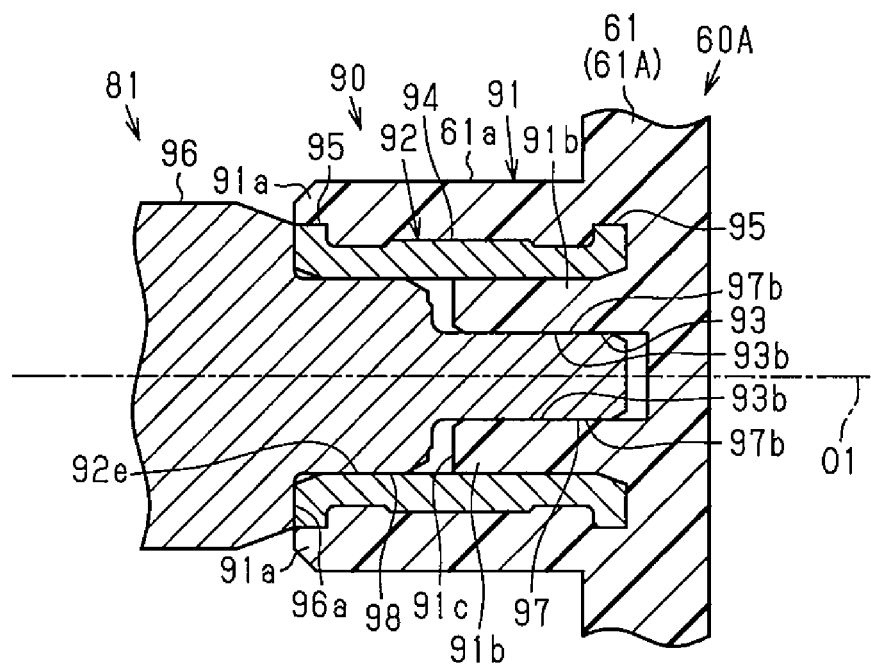
FIG. 3 is a cross-sectional view showing the connection structure of a pivot shaft and a connection portion of the airflow control valve structure according to the embodiment.

As shown in FIG. 3, the shaft portion 61a of one of the side walls 61 (hereafter also referred to as "side wall 61A") facing the pivot shaft 81 of the valve body 60A forms a connection portion 90 connected to the pivot shaft 81. The connection portion 90 includes a resin holding portion 91 formed integrally with the side wall 61A (and the valve portion 62) and a metallic bushing 92 serving as a fitting member embedded in the holding portion 91.

The holding portion 91 includes a substantially tubular outer holding portion 91a, which is concentric with the pivot axis O1 and projects from the side wall 61A, and a substantially cylindrical inner holding portion 91b, which is concentric with the outer holding portion 91a and projects from the side wall 61A at an inner side of the outer holding portion 91a. The projecting length of the inner holding portion 91b is set to be smaller than the projecting length of the outer holding portion 91a. The inner holding portion 91b includes a first valve side press-fit hole 93 serving as a first valve side press-fit portion that is recessed from a distal end surface 91c toward the side wall 61A along the pivot axis O1.

As shown in FIGS. 5A to 5C, the first valve side press-fit hole 93 is substantially oval and defined by two arcuate surfaces 93a opposing each other in the radial direction at the opposite sides of the pivot axis O1 and two flat surfaces 93b arranged in parallel with the radial direction and connecting the ends of the arcuate surfaces 93a.

The bushing 92 is substantially tubular, concentric with the pivot axis O1, and embedded in the holding portion 91 between an inner wall surface 91d of the outer holding portion 91a and an outer circumferential surface 91e of the inner holding portion 91b. An outer wall surface 92a of the bushing 92 is in close contact with the inner wall surface 91d of the outer holding portion 91a over the entire length of the outer holding portion 91a. A proximal end portion 92c of an inner circumferential surface 92b of the bushing 92 is in close contact with the outer circumferential surface 91e of the inner holding portion 91b over the entire length of the inner holding portion 91b. The outer wall surface 92a and the proximal end portion 92c form an embedded portion. A distal end portion 92d of the inner circumferential surface 92b of the bushing 92 projecting from the inner holding portion 91b forms a substantially circular second valve side press-fit hole 92e serving as a second valve side press-fit portion. The open end of the second valve side press-fit hole 92e is widened by a taper 92f. The second valve side press-fit hole 92e is concentric with the pivot axis O1.

Figure 6A:
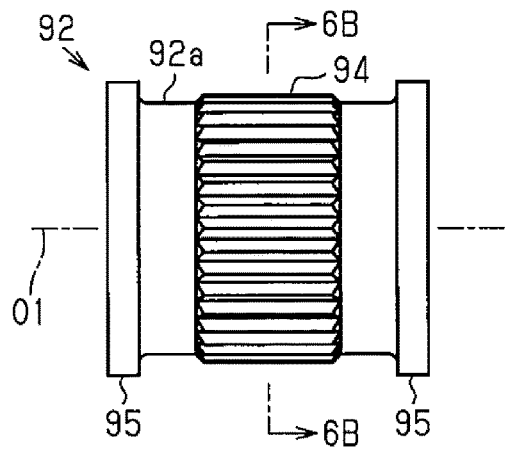
FIG. 6A is a front view showing the structure of a bushing of the airflow control valve structure according to the embodiment.
Figure 6B:
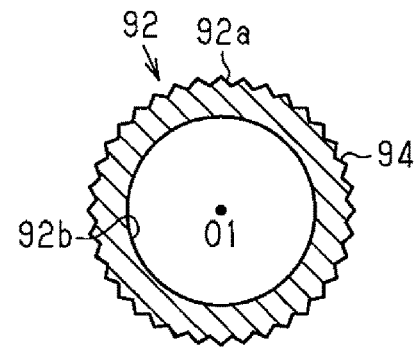
FIG. 6B is a cross-sectional view taken along line 6B-6B in FIG. 6A.

As shown in FIGS. 6A and 6B, the central portion of the outer wall surface 92a in the direction of the pivot axis O1 includes a recess-projection portion 94 serving as a zig-zagged pivoting restriction portion, which is recessed and projected at equal angular intervals (cyclically) in the radial direction about the pivot axis O1. The recess-projection portion 94 is shaped to have a substantially uniform cross section along the pivot axis O1. Further, each end of the outer wall surface 92a in the direction of the pivot axis O1 includes a flange 95 serving as a substantially annular movement restriction portion that projects outward in the radial direction about the pivot axis O1. In other words, the recess-projection portion 94 and the flanges 95 of the outer wall surface 92a mesh with the inner wall surface 91d of the outer holding portion 91a.

Figure 4A:
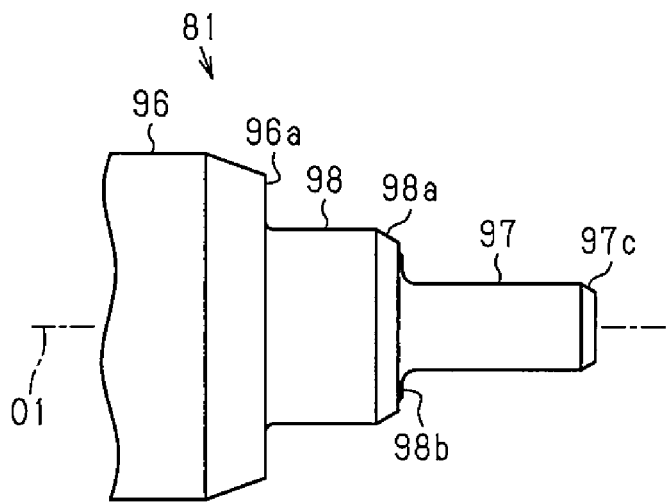
FIG. 4A is a front view and FIG. 4B is a side view showing the structure of the pivot shaft of the airflow control valve structure according to the embodiment.
Figure 4B:
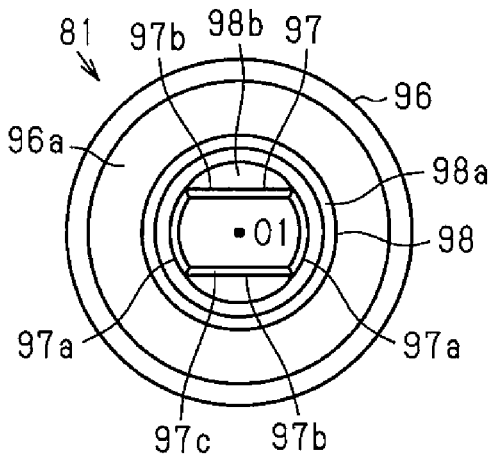

As shown in FIGS. 4A and 4B, the pivot shaft 81 includes a substantially cylindrical pivot shaft body 96 concentric with the pivot axis O1, a first pivot shaft side press-fit shaft 97 serving as a first pivot shaft side press-fit portion, and a second pivot shaft side press-fit shaft 98 serving as a second pivot shaft side press-fit portion.

The second pivot shaft side press-fit shaft 98 is substantially cylindrical, concentric with the pivot axis O1, and has an outer diameter set to be the same as the inner diameter of the second valve side press-fit hole 92e and smaller than the outer diameter of the pivot shaft body 96. The second pivot shaft side press-fit shaft 98 is concentric with the pivot shaft body 96 and projects from a distal end surface 96a, which faces the side wall 61A. The distal end of the second pivot shaft side press-fit shaft 98 is reduced in diameter at a taper 98a.

The first pivot shaft side press-fit shaft 97 is concentric with the second pivot shaft side press-fit shaft 98 and projects from a distal end surface 98b, which faces the side wall 61A. That is, the pivot shaft body 96, the second pivot shaft side press-fit shaft 98, and the first pivot shaft side press-fit shaft 97 are arranged in this order toward the side wall 61A (valve body 60A).

The first pivot shaft side press-fit shaft 97 is substantially oval and defined by two arcuate surfaces 97a, which oppose each other in the radial direction at the opposite sides of the pivot axis O1, and two flat surfaces (flat portions) 97b, which are arranged in parallel with the radial direction and connect the ends of the arcuate surfaces 97a. The gap between the arcuate surfaces 97a in the radial direction is set to be smaller than the gap between the arcuate surfaces 93a of the first valve side press-fit hole 93. Further, a chamfered portion 97c is formed on the entire circumference of the distal end of the first pivot shaft side press-fit shaft 97.

As shown in FIG. 3, the pivot shaft 81 and the connection portion 90 (valve body 60A) are connected to be pivoted integrally by press-fitting the first pivot shaft side press-fit shaft 97 into the first valve side press-fit hole 93 and press-fitting the second pivot shaft side press-fit shaft 98 into the second valve side press-fit hole 92e in a state in which the two flat surfaces 97b are pressed against the two flat surfaces 93b. In this case, the arcuate surfaces 97a are held in abutment with or in the proximity of the arcuate surfaces 93a. In other words, the phases of the pivot shaft 81 and the connection portion 90 are restricted when the flat surfaces 97b are pressed against the flat surfaces 93b. Further, the pivot shaft 81 and the connection portion 90 (valve body 60A) are more firmly coupled by press-fitting the second pivot shaft side press-fit shaft 98 into the second valve side press-fit hole 92e of the metallic bushing 92, that is, by press fitting metallic parts.

Figure 7A:
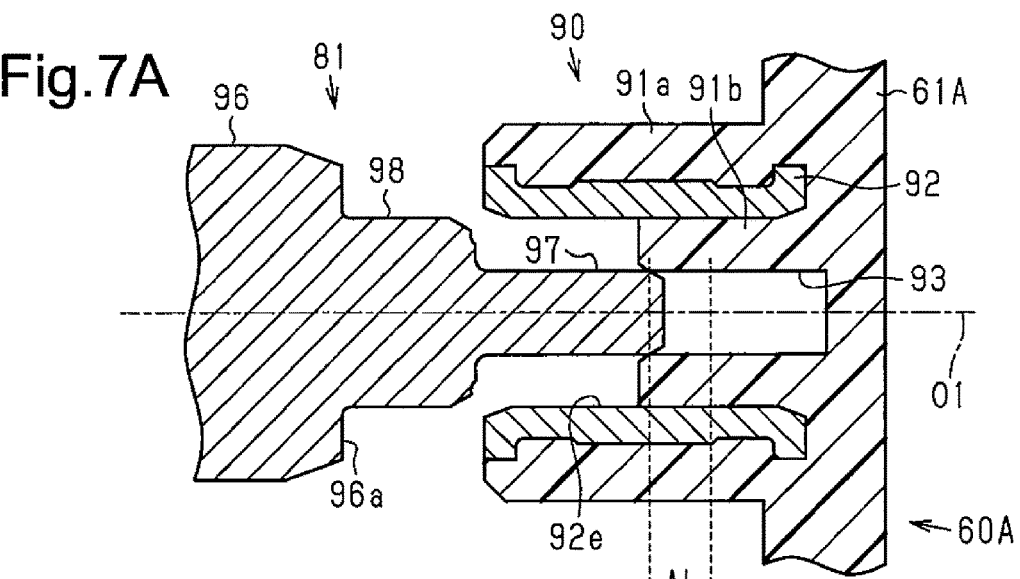
FIG. 7A and FIG. 7B are diagrams showing a connection step of the pivot shaft and the connection of the airflow control valve structure according to the embodiment.
Figure 7B:
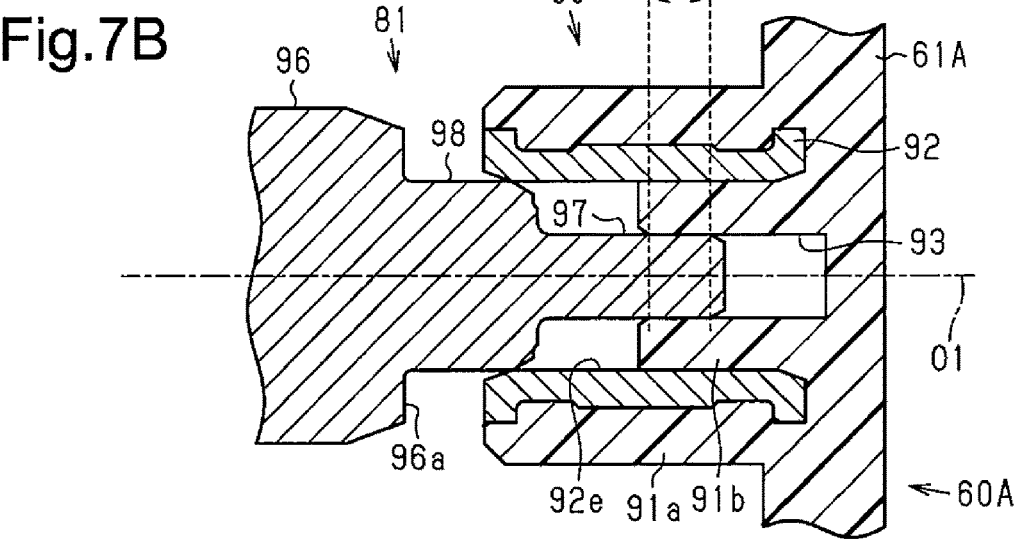

With respect to the dimensions in the direction of the pivot axis O1, the first pivot shaft side press-fit shaft 97 is set to be longer than the second valve side press-fit hole 92e. That is, as shown in FIGS. 7A and 7B, in the connection step of the pivot shaft 81 and the connection portion 90, when moving the pivot shaft 81 toward the connection portion 90 along the pivot axis O1, the distal end of the first pivot shaft side press-fit shaft 97 passes through the second valve side press-fit hole 92e and abuts on the open end of the first valve side press-fit hole 93 thereby starting press-fitting into the first valve side press-fit hole 93. In this stage, the distal end of the second pivot shaft side press-fit shaft 98 has not reached the open end of the second valve side press-fit hole 92e. Then, the pivot shaft 81 is moved further toward the connection portion 90 by distance ΔL along the pivot axis O1, and the distal end of the second pivot shaft side press-fit shaft 98 abuts on the open end of the second valve side press-fit hole 92e, thereby starting press-fitting into the second valve side press-fit hole 92e. This projection in press fitting of the first pivot shaft side press-fit shaft 97 remains moved ahead of the second pivot shaft side press-fit shaft 98 over distance ΔL until the distal end surface 96a of the pivot shaft body 96 abuts on the distal end surface of the bushing 92 (connection portion 90) and the connection step of the pivot shaft 81 and the connection portion 90 ends.

In other words, with respect to the dimensions in the direction of the pivot axis O1, the first pivot shaft side press-fit shaft 97 being set to be longer than the second valve side press-fit hole 92e indicates a substantial dimensional difference causing the point in time at which the first pivot shaft side press-fit shaft 97 undergoes press-fitting to be after the point in time at which the second valve side press-fit hole 92e is press-fitted by an amount corresponding to distance ΔL. Thus, this does not indicate a dimensional difference that is non-essential.

The connection structure of the pivot shaft 73 and the valve body 60A is the same and includes elements denoted with the reference numerals in the 90s.

The operation and advantages of the present embodiment will now be described.

(1) In the present embodiment, with respect to the dimensions in the direction of the pivot axis O1, the first pivot shaft side press-fit shaft 97 is set to be longer than the second valve side press-fit hole 92e. Thus, when connecting the pivot shafts 73 and 81 to the valve body 60A, at the connection portions 90 of the valve body 60A, the first pivot shaft side press-fit shafts 97 of the pivot shafts 73 and 81 are press-fitted into the first valve side press-fit holes 93 before the second pivot shaft side press-fit shafts 98 are press-fitted into the second valve side press-fit holes 92e. In other words, relative pivoting of the pivot shafts 73 and 81 and the valve body 60A is restricted in a state in which the phases of the pivot shafts 73 and 81 and the valve body 60A (and the valve portion 62) are matched in advance. Then, the second pivot shaft side press-fit shafts 98 of the pivot shafts 73 and 81 are press-fitted into the second valve side press-fit holes 92e of the metallic bushings 92, that is, metallic parts are press-fitted, to further firmly couple the pivot shafts 73 and 81 to the valve body 60A. As a result, the electric actuator 7 (and the sensor unit 8) and the valve body 60A (intake control valve body 6) are further firmly coupled while reducing phase shifting.

(2) In the present embodiment, the second pivot shaft side press-fit shaft 98 and the first pivot shaft side press-fit shaft 97 are arranged in this order toward the side wall 61A (valve body 60A). That is, the first pivot shaft side press-fit shaft 97 is arranged at the head side when connecting the pivot shafts 73 and 81 and the connection portions 90. Thus, the second pivot shaft side press-fit shaft 98 does not affect the movement (coupling) of the first pivot shaft side press-fit shaft 97 regardless of its shape. Accordingly, the surface area of the second pivot shaft side press-fit shaft 98 per unit length in the direction of the pivot axis O1 may be larger than the surface area of the first pivot shaft side press-fit shaft 97 per unit length in the same direction. Further, the contact (press contact) area between the second pivot shaft side press-fit shaft 98 and the second valve side press-fit hole 92e is increased. This further firmly couples the pivot shafts 73 and 81 and the valve body 60A (connection portions 90).

(3) In the present embodiment, the bushing 92 is embedded in the holding portion 91 such that the bushing 92 is arranged between the inner wall surface 91d of the outer holding portion 91a and the outer circumferential surface 91e of the inner holding portion 91b. Thus, the bushing 92 is efficiently arranged without being enlarged in the direction of the pivot axis O1. Further, the outer wall surface 92a of the bushing 92 is in close contact with the inner wall surface 91d of the outer holding portion 91a over its entire length, and the proximal end portion 92c of the inner circumferential surface 92b of the bushing 92 is in close contact with the outer circumferential surface 91e of the inner holding portion 91b over its entire length. This further firmly fixes the bushing 92 to the holding portion 91.

(4) In the present embodiment, the second pivot shaft side press-fit shaft 98 and the second valve side press-fit hole 92e (bushing 92) are substantially cylindrical and substantially circular, respectively. Thus, the second pivot shaft side press-fit shafts 98 can be press-fitted into the second valve side press-fit holes 92e (bushing 92) at any angle. The first pivot shaft side press-fit shafts 97 are press-fitted into the first valve side press-fit holes 93. Thus, the phases of the pivot shafts 73 and 81 and the valve body 60A that have been matched in advance are less likely to be shifted. Further, the recess-projection portion 94 of the bushing 92 restricts pivoting of the bushing 92 relative to the holding portion 91 when the bushing 92 closely meshes with the inner wall surface 91d of the outer holding portion 91a (part of holding portion 91).

(5) In the present embodiment, the recess-projection of the recess-projection portion 94 is formed at equal angular intervals around the pivot axis O1. This uniformly disperses twisting force of the pivot shafts 73 and 81 relative to the outer holding portion 91a (part of the holding portion 91). Further, pivoting of the bushing 92 relative to the holding portion 91 is efficiently restricted with a very simple structure in which the bushing 92 according to the recess-projection of the recess-projection portion 94 meshes with the inner wall surface 91d of the resin outer holding portion 91a.

(6) In the present embodiment, the ends of the outer wall surface 92a of the bushing 92 in the direction of the pivot axis O1 each include the substantially annular flange 95 that projects outward in the radial direction relative to the pivot axis O1. This restricts movement of the bushing 92 in the direction of the pivot axis O1 relative to the outer holding portion 91a (part of holding portion 91). Thus, displacement of the valve body 60A and the pivot shafts 73 and 81 in the direction of the pivot axis O1 is reduced in a state in which the pivot shafts 73 and 81 and the bushings 92 are press-fitted.

(7) In the present embodiment, displacement of the bushing 92 relative to the holding portion 91 in the direction of the pivot axis O1 are restricted with a very simple structure in which the bushing 92 including the flange 95 meshes with the inner wall surface 91d of the resin outer holding portion 91a (part of the holding portion 91).

(8) In the present embodiment, the first pivot shaft side press-fit shaft 97 and the first valve side press-fit hole 93 respectively include the flat surface 97b and the flat surface 93b, which are very easy to machine. This matches the phases of the first pivot shaft side press-fit shaft 97 and the first valve side press-fit hole 93 utilizing a very simple structure.

(9) In the present embodiment, the electric actuator (or the sensor unit 8) arranged integrally with the pivot shaft 73 is further firmly coupled to the valve body 60A (intake control valve body 6) while reducing phase shifting.

(10) In the present embodiment, the outer circumferential surface 91e of the inner holding portion 91b is in close contact with the inner circumferential surface 92b of the bushing 92. This reduces deformation of the inner holding portion 91b in the radial direction relative to the pivot axis O1 by the bushing 92 when the metallic first pivot shaft side press-fit shaft 97 is press-fitted into the resin inner holding portion 91b (first valve side press-fit hole 93).

The above embodiment may be modified as follows.

Figure 8A:
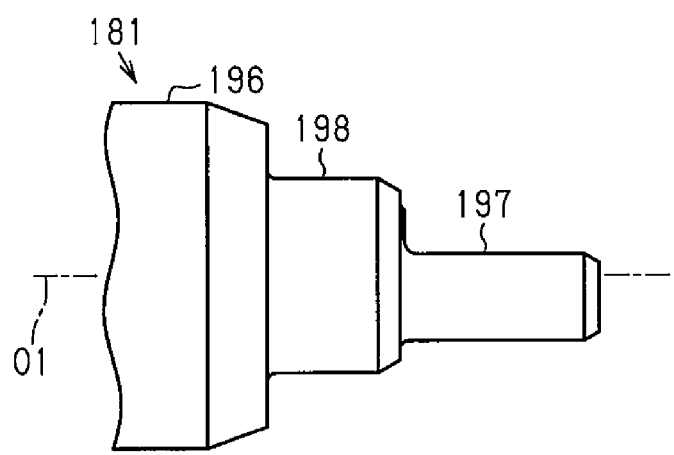
FIG. 8A is a front view and FIG. 8B is a side view showing the structure of a modified form of the airflow control valve structure.
Figure 8B:
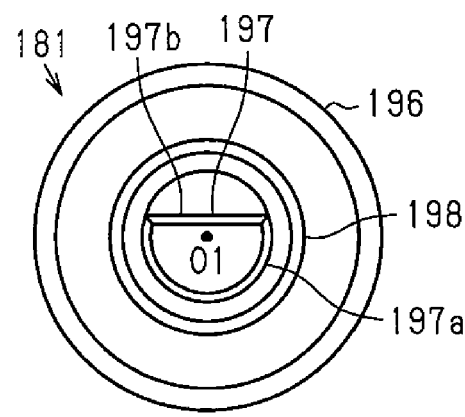

The pivot shafts 73 and 81 may be a pivot shaft 181 as shown in FIGS. 8A and 8B. In other words, the pivot shaft 181 includes a pivot shaft body 196 corresponding to the pivot shaft body 96 and a second pivot shaft side press-fit shaft 198 corresponding to the second pivot shaft side press-fit shaft 98. A first pivot shaft side press-fit shaft 197 is concentric with the second pivot shaft side press-fit shaft 198 and projects from the distal end surface of the second pivot shaft side press-fit shaft 198. The first pivot shaft side press-fit shaft 197, which is substantially cylindrical in part, includes a major arc surface 197a that extends about the pivot axis O1 and a flat surface 197b that connects ends of the major arc surface 197a.

Figure 9A:
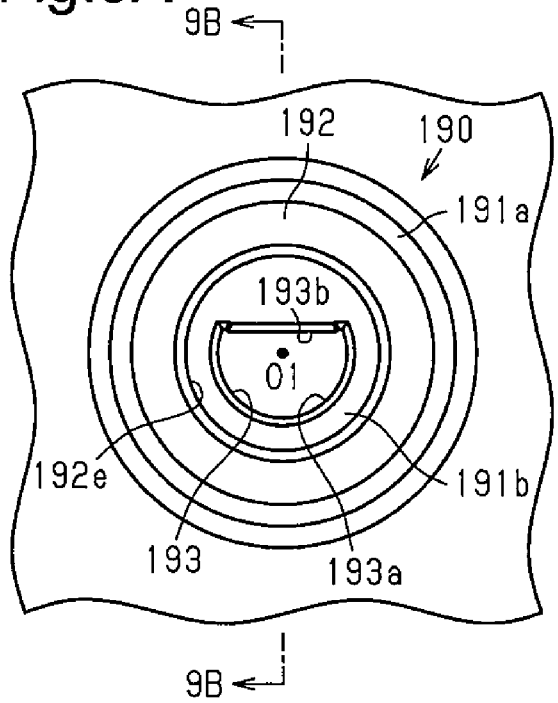
FIG. 9A is a side view showing the structure of the modified form of the airflow control valve structure.
Figure 9B:
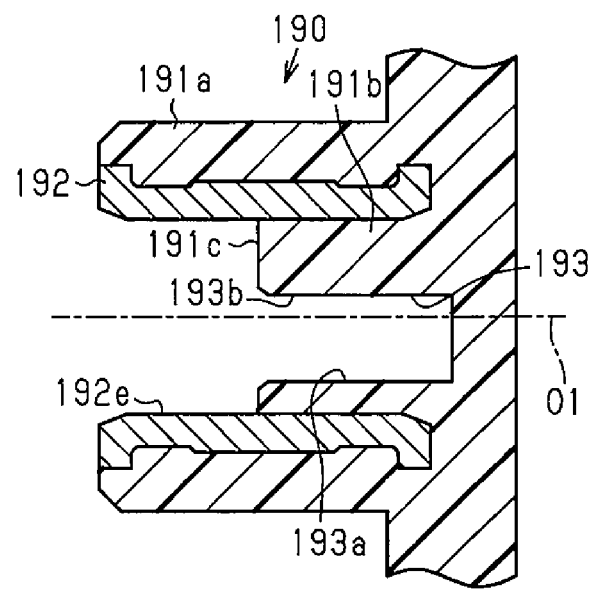
FIG. 9B is a cross-sectional view taken along line 9B-9B in FIG. 9A.

In accordance with this modification, the connection portion 90 may be a connection portion 190 as shown in FIGS. 9A and 9B. In other words, the connection portion 190 includes an outer holding portion 191a corresponding to the outer holding portion 91a, an inner holding portion 191b corresponding to the inner holding portion 91b, and a bushing 192 (second valve side press-fit hole 192e) corresponding to the bushing 92. The inner holding portion 191b includes a first valve side press-fit hole 193 serving as a first valve side press-fit portion recessed from a distal end surface 191c along the pivot axis O1. The first valve side press-fit hole 193, which is substantially circular in part, includes a major arc surface 193a that extends about the pivot axis O1 and a flat surface 193b that connects ends of the major arc surface 193a.

In this case, the pivot shaft 181 and the connection portion 190 are connected to be pivoted integrally when the first pivot shaft side press-fit shaft 197 and the second pivot shaft side press-fit shaft 198 are respectively press-fitted into the first valve side press-fit hole 193 and the second valve side press-fit hole 192e. This modification also has the same advantages as the above embodiment. In addition, the first pivot shaft side press-fit shaft 97 includes the two flat surfaces 97b that are required to be shaped by cutting out two surfaces from a cylindrical part serving as a material. In contrast, the first pivot shaft side press-fit shaft 197 includes the flat surface 197b formed by cutting out one surface from a cylindrical material. This reduces manufacturing steps and costs.

When the pivot shafts 73 and 81 and the connection portion 90 are connected, two press-contact surfaces at the two flat surfaces 97b and the flat surfaces 93b determine the phase. In contrast, when the pivot shaft 181 and the connection portion 190 are connected, one press-contact surface at the major arc surface 197a and the flat surface 193b determine the phase. Thus, the capability for reducing phase shifting resulting from the press fitting of the first pivot shaft side press-fit shaft 197 into the first valve side press-fit hole 193 is relatively inferior to the capability to reduce phase shifts resulting from the press fitting of the first pivot shaft side press-fit shaft 97 into the first valve side press-fit hole 193.

The phases of the pivot shaft 73 and the connection portion 90 affect the initial phases of the intake manifold 3 and the drive gear 72 by the mechanical lock unit. However, the phases of the pivot shaft 81 and the connection portion 90 may be adjusted in an electric process when initially setting the sensor unit 8. Thus, when replacing one of the pivot shaft 73 and the pivot shaft 81 with the pivot shaft 181, it is preferred that the pivot shaft 81 be replaced. In this case, the pivot shaft 73 near the electric actuator 7 and the pivot shaft 181 near the sensor unit 8 have different structures. This reduces erroneous coupling.

In the above embodiment, the recess-projection portion 94 may be formed to be recessed and projected toward the inner holding portion 91b.

In the above embodiment, the recess-projection portion 94 may be recessed and projected from an end surface of the bushing 92 near the side wall 61A toward the side wall 61A in the direction of the pivot axis O1.

In the above embodiment, the recess-projection portion 94 may be a recess-projection portion that is recessed and projected in a wave-shaped manner, a non-continuous manner, or a non-cyclic manner. Alternatively, the outer wall surface 92a may have an elliptic shape instead of the recess-projection portion 94.

In the embodiment, the recess-projection portion 94 may be omitted.

In the embodiment, the flange 95 of the bushing 92 near the side wall 61A may be formed to project toward the inner holding portion 91b.

In the embodiment, the flange 95 may be formed at any location of the bushing 92 in the direction of the pivot axis O1.

In the embodiment, the flange 95 may be omitted.

In the embodiment, the press-fit structure of the pivot shafts 73 and 81 and the valve bodies 60A may be applied to the connection shafts 63 and the valve bodies 60.

In the embodiment, the first pivot shaft side press-fit shaft 97 and the second pivot shaft side press-fit shaft 98 may be arranged in this order toward the valve body 60A. The positional relationship between the second valve side press-fit hole 92e and the first valve side press-fit hole 93 may be changed accordingly.

In the embodiment, the number of the flat surfaces 93b, 193b, 97b, and 197b for restricting the phases of the pivot shafts 73, 81, and 181 and the connection portions 90 and 190 may be greater than or equal to three. For example, the first pivot shaft side press-fit shaft 97 and 197 may be formed to have the shape of a substantially polygonal column and the first valve side press-fit holes 93 and 193 may be formed accordingly to be substantially polygonal.

In the embodiment, the pivot shafts 73, 81, and 181 include the first pivot shaft side press-fit portion and the second pivot shaft side press-fit portion that are formed to be cylindrical (first pivot shaft side press-fit shaft 97 and 197 and the second pivot shaft side press-fit shaft 98 and 198). The connection portions 90 and 190 include the first valve side press-fit portion and the second valve side press-fit portion that are formed to be hole-shaped (first valve side press-fit hole 93 and 193 and second valve side press-fit hole 92e and 192e). However, the pivot shafts 73, 81, and 181 may include the first pivot shaft side press-fit portion and the second pivot shaft side press-fit portion that are formed to be hole-shaped, and the connection portions 90 and 190 may include the first valve side press-fit portion and the second valve side press-fit portion that are formed to be cylindrical.

The invention claimed is:
1. An airflow control valve structure, comprising:
a metallic pivot shaft pivoted about a pivot axis; and
a valve body including a connection portion that is connected to the metallic pivot shaft to pivot integrally with the metallic pivot shaft and a resin valve portion that opens and closes a part of a cross-sectional area of an intake passage, wherein
the metallic pivot shaft includes a first pivot shaft side press-fit portion and a second pivot shaft side press-fit portion that are formed along the pivot axis, and
the connection portion includes
a first valve side press-fit portion formed integrally with the resin valve portion, wherein the first valve side press-fit portion is fitted to the first pivot shaft side press-fit portion at an angular position at which a phase of the resin valve portion is matched with a phase of the metallic pivot shaft, and
a metallic fitting member including a second valve side press-fit portion fitted to the second pivot shaft side press-fit portion,
wherein the first pivot shaft side press-fit portion is set to be longer than the second valve side press-fit portion in dimension in a pivot axis direction.

2. The airflow control valve structure according to claim 1, wherein the metallic pivot shaft extends along the pivot axis such that the second pivot shaft side press-fit portion and the first pivot shaft side press-fit portion are arranged in order toward the valve body.

3. The airflow control valve structure according to claim 1, wherein the first pivot shaft side press-fit portion and the first valve side press-fit portion include flat portions formed along the pivot axis and abut against each other.

4. An intake device comprising:

the airflow control valve structure according to claim 1; and a power transmission member rotated integrally with the metallic pivot shaft.

5. The airflow control valve structure according to claim 1, wherein the connection portion includes a holding portion formed integrally with the resin valve portion, and the metallic fitting member includes an embedded portion embedded in the holding portion.

6. The airflow control valve structure according to claim 5, wherein the second pivot shaft side press-fit portion is cylindrical and the second valve side press-fit portion is tubular, and the embedded portion includes a pivoting restriction portion that restricts pivoting relative to the holding portion.

7. The airflow control valve structure according to claim 6, wherein the pivoting restriction portion includes a recess-projection portion that is recessed and projected at equal angular intervals in a radial direction about the pivot axis.

8. The airflow control valve structure according to claim 5, wherein the embedded portion includes a movement restriction portion that restricts movement of the embedded portion in the pivot axis direction relative to the holding portion.

9. The airflow control valve structure according to claim 8, wherein the movement restriction portion includes a flange at a predetermined location in the pivot axis direction, and the flange projects in a radial direction about the pivot axis.

* * * * *